United States Patent Office 3,005,843  
Patented Oct. 24, 1961

---

3,005,843  
O-CARBAZYL-DL-SERINE  
William Shive and Charles Gordon Skinner, Jr., Austin, Tex.  
No Drawing. Filed Dec. 15, 1959, Ser. No. 859,581  
3 Claims. (Cl. 260—482)

This invention relates to O-carbazyl-DL-serine of the formula (1) 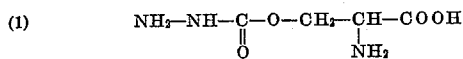

and its hydrazone derivatives.

The novel O-carbazyl-DL-serine is prepared by reacting N-carbobenzoxy-DL-serine benzyl ester is a suitable organic solvent medium, such as toluene, with phosgene. The reaction is preferably carried out at a reduced temperature, such as 0–5° C. and over an extended period of time, such as about 15 to 20 hours. From the reaction mixture, the solvent is removed, conveniently under reduced pressure and with warming. The product then is preferably freed of residual phosgene and HCl gas by repeated addition and evaporation of benzene or other suitable solvent.

The resultant material in a suitable organic solvent, such as dioxane, is reacted, preferably by gradual addition with stirring, with carbobenzoxyhydrazide, also in a suitable solvent, such as ethanol, preferably in the presence of aqueous sodium carbonate at reduced initial temperatures, such as 5 to 10° C. As will be readily understood in the art, any appropriately substituted hydrazine derivative other than carbobenzoxyhydrazide can serve as a source of the hydrazine moiety, provided that the protective substituted group can be later removed without destroying the final compound. The recovered residue is purified by any convenient method or methods, admixed in a suitable medium, such as aqueous ethanol, hydrogenolyzed, using a suitable catalyst if desired, and the O-carbazyl-DL-serine product recovered by any convenient procedure.

In a further embodiment of this process, the O-carbazyl-DL-serine is reacted with a suitable aliphatic or aromatic carbonyl reagent, preferably an aldehyde such as formaldehyde or benzaldehyde, to form the corresponding hydrazone derivatives. These derivatives can be identified by the formula (2) 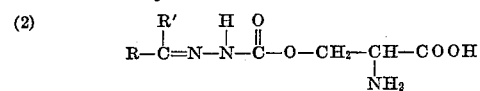

where R and R' can be the same or different and can be hydrogen, substituted or unsubstituted alkyl, or substituted or unsubstituted aryl. As will be readily understood in the art, the carbonyl reagent is not critical and the term carbonyl reagent embraces any such carbonyl reagent reactive with the O-carbazyl-DL-serine of this invention.

The compounds of this invention are useful as antibacterials, inhibiting the growth, for example, of *Lactobacillus arabinosus* and *Streptococcus lactis*. It is well known in the bacteriological art that the latter organism is primarily responsible for souring raw milk. See "Principles of Microbiology," Carter and Smith (1954), page 549, and "Microbiology, General and Applied," Sarles and Frazier (1947), page 199. A 0.1% solution of these compounds in water is useful as a rinse for dairy equipment.

The invention will be described in greater detail by the following specific example:

Example

A mixture of 6.6 g. of N-carbobenzoxy-DL-serine benzyl ester partially dissolved in 75 ml. of toluene was saturated with phosgene at 0–5° C. The reaction mixture was kept for 16 hours at room temperature in a rubber-stoppered flask to effect complete reaction. The solvent was removed under reduced pressure, with warming, to yield a pale yellow oil which was freed of residual phosgene and hydrogen chloride gas by repeated addition and evaporation of benzene. A solution of this oil dissolved in 30 ml. of dry dioxane was added over a period of 1.5 hours to a stirred mixture of 5.0 g. of carbobenzoxyhydrazide in 75 ml. of ethanol plus 1.1 g. of sodium carbonate in 20 ml. of water at 5–10° C. After completing the addition, the reaction mixture was stirred for one hour with continued cooling and then at room temperature for 4 hours. After reduction in volume in vacuo, with warming, the residue was dried by repeated addition and evaporation of benzene. Then, the residue was slurried with 75 ml. of warm ethanol, and the sodium chloride was removed by filtration. Finally, an additional 150 ml. of ethanol was added followed by water until a slight turbidity persisted. The resulting mixture was then placed under hydrogen gas at atmospheric pressure and room temperature in the presence of 0.7 g. of palladium black for 6 hours. The catalyst was filtered, washed with warm water and the combined filtrates were taken to dryness under reduced pressure with warming. The solid residue was recrystallized from alcohol-water to yield 1.7 g. of O-carbazyl-DL-serine, M.P. 193–195° C. dec.

*Anal.*—Calcd. for $C_4H_9N_3O_4$: C, 29.44; H, 5.56; N, 25.76. Found: C, 29.86; H, 5.76; N, 25.96.

The O-carbazyl-DL-serine was reacted with formaldehyde and benzaldehyde, respectively, to yield the corresponding hydrazone derivatives.

This application is a continuation-in-part of application number 778,283, filed December 5, 1958, and now abandoned.

The invention claimed is:

1. A compound selected from the group consisting of O-carbazyl-DL-serine and its formaldehyde and benzaldehyde hydrazone derivatives.
2. O-carbazyl-DL-serine.
3. The process of preparing O-carbazyl-DL-serine comprising reacting N-carbobenzoxy-DL-serine benzyl ester with phosgene to form a reaction product, reacting the latter with carbobenzoxyhydrazide, hydrogenolyzing the resultant product, and recovering the prepared O-carbazyl-DL-serine.

References Cited in the file of this patent

UNITED STATES PATENTS 2,885,433    Hagemann et al. _____ May 5, 1959

OTHER REFERENCES

McCord et al.: J.A.C.S., vol. 80, No. 14, pp. 3762–4 (1958).